United States Patent
Fukui et al.

(10) Patent No.: US 10,612,495 B2
(45) Date of Patent: Apr. 7, 2020

(54) EVAPORATED FUEL TREATING DEVICE

(71) Applicants: TOYOTA JIDOSHA KABUSHIKI KAISHA, Toyota-shi, Aichi-ken (JP); AISAN KOGYO KABUSHIKI KAISHA, Obu-shi, Aichi-ken (JP)

(72) Inventors: Keita Fukui, Fujinomiya (JP); Makoto Yamazaki, Gotemba (JP); Yoshikazu Miyabe, Obu (JP)

(73) Assignees: TOYOTA JIDOSHA KABUSHIKI KAISHA, Toyota-Shi (JP); AISAN KOGYO KABUSHIKI KAISHA, Obu-Shi (JP)

(*) Notice: Subject to any disclaimer, the term of this patent is extended or adjusted under 35 U.S.C. 154(b) by 33 days.

(21) Appl. No.: 15/923,762

(22) Filed: Mar. 16, 2018

(65) Prior Publication Data
US 2018/0274494 A1 Sep. 27, 2018

(30) Foreign Application Priority Data
Mar. 22, 2017 (JP) .................................. 2017-056339

(51) Int. Cl.
*F02M 25/08* (2006.01)
*B60K 15/035* (2006.01)
*H02P 8/38* (2006.01)

(52) U.S. Cl.
CPC ....... *F02M 25/0836* (2013.01); *B60K 15/035* (2013.01); *B60K 15/03504* (2013.01);
(Continued)

(58) Field of Classification Search
CPC .............. F02M 25/0836; F02M 25/08; F02M 25/0854; B60K 15/03519;
(Continued)

(56) References Cited

U.S. PATENT DOCUMENTS 5,245,975 A * 9/1993 Ito .......................... F02B 23/104
123/520
5,425,349 A 6/1995 Nagaishi et al.
(Continued)

FOREIGN PATENT DOCUMENTS

JP H05280654 A 10/1993
JP H10178800 A 6/1998
(Continued)

*Primary Examiner* — Joseph J Dallo
(74) *Attorney, Agent, or Firm* — Hunton Andrews Kurth LLP

(57) ABSTRACT

An evaporated fuel treating device includes: a canister configured to adsorb evaporated fuel generated in a fuel tank through a vapor passage; a blocking valve configured to close and open the vapor passage, the blocking valve having a stepping motor as a drive source; and a controller configured to operate the blocking valve by controlling electric power that is supplied from a predetermined power supply to the blocking valve. The controller is configured, when there is a request to drive the blocking valve, to operate the blocking valve by controlling the electric power such that when a voltage that is supplied from the power supply to the blocking valve is less than a predetermined value, a driving period which is an interval between pulses that are supplied to the stepping motor becomes long compared to when the voltage is equal to or higher than the predetermined value.

8 Claims, 8 Drawing Sheets

(52) U.S. Cl.
CPC ....... *B60K 15/03519* (2013.01); *F02M 25/08* (2013.01); *F02M 25/0854* (2013.01); *H02P 8/38* (2013.01); *B60K 2015/0358* (2013.01); *B60K 2015/03514* (2013.01)

(58) Field of Classification Search
CPC ............ B60K 15/03504; B60K 15/035; B60K 2015/03514; B60K 2015/0358; H02P 8/38

See application file for complete search history.

(56) References Cited

U.S. PATENT DOCUMENTS

| | | | | |
|---|---|---|---|---|
| 5,636,617 | A * | 6/1997 | Nakatsu | F02M 25/0836 123/516 |
| 5,690,086 | A * | 11/1997 | Kawano | F02D 41/0045 123/674 |
| 6,276,343 | B1 * | 8/2001 | Kawamura | F02M 25/0809 123/516 |
| 6,415,779 | B1 * | 7/2002 | Colomby | F02D 41/0032 123/674 |
| 2009/0099795 | A1 * | 4/2009 | Behar | F02M 25/0818 702/51 |
| 2011/0168931 | A1 * | 7/2011 | Sugiura | F16K 1/443 251/129.15 |
| 2011/0296997 | A1 * | 12/2011 | Sugiura | F02M 25/0836 96/147 |
| 2014/0102420 | A1 | 4/2014 | Kimoto et al. | |
| 2015/0096355 | A1 * | 4/2015 | Makino | F02M 25/0818 73/40.7 |
| 2015/0292447 | A1 | 10/2015 | Tagawa et al. | |
| 2015/0330337 | A1 * | 11/2015 | Tagawa | F02D 41/222 123/519 |
| 2016/0186700 | A1 | 6/2016 | Nishiura et al. | |
| 2017/0145932 | A1 * | 5/2017 | Tagawa | B01D 53/0407 |
| 2017/0159616 | A1 * | 6/2017 | Miyabe | F02M 25/0809 |
| 2017/0167413 | A1 * | 6/2017 | Tagawa | F02D 41/003 |
| 2017/0282706 | A1 * | 10/2017 | Miyabe | F02M 25/08 |
| 2017/0284321 | A1 * | 10/2017 | Kimoto | F02D 41/0042 |
| 2017/0292477 | A1 * | 10/2017 | Kimoto | F02M 37/00 |
| 2017/0328311 | A1 * | 11/2017 | Franklin | B60K 15/03519 |
| 2018/0087475 | A1 * | 3/2018 | Mills | B60K 15/03519 |

FOREIGN PATENT DOCUMENTS

| | | |
|---|---|---|
| JP | 2006177903 A | 7/2006 |
| JP | 2015-203344 A | 11/2015 |

* cited by examiner

EVAPORATED FUEL TREATING DEVICE

INCORPORATION BY REFERENCE

The disclosure of Japanese Patent Application No. 2017-056339 filed on Mar. 22, 2017 including the specification, drawings and abstract is incorporated herein by reference in its entirety.

BACKGROUND

1. Technical Field

The disclosure relates to an evaporated fuel treating device for treating evaporated fuel that is generated in a fuel tank.

2. Description of Related Art

As an evaporated fuel treating device, an evaporated fuel treating device that is provided with a blocking valve for opening and closing a vapor passage connecting a fuel tank and a canister and provided with a stepping motor as a drive source of the blocking valve is known (Japanese Unexamined Patent Application Publication No. 2015-203344 (JP 2015-203344 A)). JP 2015-203344 A discloses a technical matter in which the abnormality of opening fixing and closing fixing of the blocking valve is determined at the time of the original opening and closing operation of the blocking valve and the blocking valve is not operated solely for the abnormality determination.

SUMMARY

In general, the stepping motor operates in a state where the relationship between the number of pulses supplied and the rotation amount (the number of steps) is maintained. Then, a state in which a deviation occurs in the relationship, so that control to the target rotation amount cannot be performed, is referred to as step-out. The lower the motor torque is, the more easily the step-out of the stepping motor occurs. The motor torque becomes smaller as a voltage that is supplied to the stepping motor decreases. For this reason, in the case of the device using a stepping motor as a drive source of the blocking valve, as disclosed in JP 2015-203344 A, when the step-out occurs at the time of a decrease in the voltage that is supplied to the blocking valve, there is a possibility that an accurate operation of the blocking valve may be hindered.

Therefore, the disclosure provides an evaporated fuel treating device in which it is possible to reduce or eliminate a possibility that step-out of a stepping motor which is a drive source of a blocking valve may occur at the time of a decrease in a voltage that is supplied to the blocking valve.

An aspect of the disclosure relates to an evaporated fuel treating device including: a canister configured to adsorb evaporated fuel generated in a fuel tank through a vapor passage; a blocking valve configured to close and open the vapor passage, the blocking valve having a stepping motor as a drive source; and a controller configured to operate the blocking valve by controlling electric power that is supplied from a predetermined power supply to the blocking valve. The controller is configured, in a case where there is a request to drive the blocking valve, to operate the blocking valve by controlling the electric power such that when a voltage that is supplied from the power supply to the blocking valve is less than a predetermined value, a driving period which is an interval between pulses that are supplied to the stepping motor becomes long compared to when the voltage is equal to or higher than the predetermined value.

In a case where the stepping motor has the same motor torque, the shorter the driving period that is the interval between the pulses supplied to the stepping motor is, the more easily the step-out occurs. Therefore, when the stepping motor is driven in the driving period before a decrease in voltage in a state where the motor torque is reduced due to a decrease in the voltage supplied to the stepping motor, the driving period becomes too short with respect to the decreased motor torque, and thus there is a possibility that the step-out may occur. In the evaporated fuel treating device according to the aspect of the disclosure, when the voltage that can be supplied to the blocking valve is less than a predetermined value, the electric power is controlled such that the driving period becomes longer than when the voltage is equal to or higher than the predetermined value. For this reason, at the time of a decrease in the supply voltage, the driving period becomes longer than before the decrease in the supply voltage, and therefore, it becomes difficult for the stepping motor to step out. Accordingly, it is possible to reduce a possibility that the step-out of the stepping motor that is the drive source of the blocking valve may occur. That is, even if it is not possible to eliminate the possibility of the step-out of the stepping motor occurring, it is possible to reduce the possibility of the step-out occurring at the time of a decrease in the supply voltage.

In the evaporated fuel treating device according to the aspect of the disclosure, the controller may be configured, in a case where an environmental temperature measured by a temperature sensor is high, to set the predetermined value to be higher than in a case where the environmental temperature is low. The lower limit value of the voltage in which the minimum drive current required for the operation of the blocking valve can be secured becomes higher as the environmental temperature is higher. Therefore, the driving period is changed according to the environmental temperature by setting the predetermined value to be higher as the environmental temperature is higher, and therefore, the relationship between the environmental temperature and the driving period can be optimized.

In the evaporated fuel treating device according to the aspect of the disclosure, the controller may be configured to set the predetermined value to a value higher than the minimum drive voltage determined in advance for each environmental temperature.

In the evaporated fuel treating device according to the aspect of the disclosure, the controller may be configured to operate the blocking valve in a first driving period in a case where the voltage is less than the predetermined value, and be configured to operate the blocking valve in a second driving period shorter than the first driving period, in a case where the voltage is equal to or higher than the predetermined value. According to the aspect of the disclosure, the possibility of the step-out occurring can be reduced by simple control of selectively using two long and short driving periods.

In the evaporated fuel treating device according to the aspect of the disclosure, the controller may be configured to change the driving period according to a magnitude of the voltage in a case where the voltage is less than the predetermined value. According to the aspect of the disclosure, since the driving period according to the voltage is selected, the relationship between the voltage and the driving period can be optimized.

In the evaporated fuel treating device according to the aspect of the disclosure, the controller may be configured to set the driving period to be longer as the voltage is lower, in a case where the voltage is less than the predetermined value.

In the evaporated fuel treating device according to the aspect of the disclosure, the controller may be configured to set the driving period within a range in which step-out of the stepping motor is avoided, in a case where the voltage is less than the predetermined value. According to the aspect of the disclosure, since the driving period is set within a range in which the step-out of the stepping motor can be avoided, the possibility of the step-out occurring can be eliminated.

In the evaporated fuel treating device according to the aspect of the disclosure, the controller may be configured to set the predetermined value such that the predetermined value in a case where the voltage decreases and the predetermined value in a case where the voltage rises are different from each other.

As described above, in the evaporated fuel treating device according to the aspect of the disclosure, when a voltage that can be supplied to the blocking valve is less than a predetermined value, electric power is controlled such that the driving period becomes longer than when the voltage is equal to or higher than the predetermined value. For this reason, at the time of a decrease in the supply voltage, the driving period becomes longer than before the decrease in the supply voltage, and thus it becomes difficult for the stepping motor to step out. Accordingly, it is possible to reduce a possibility that the step-out of the stepping motor which is a drive source of the blocking valve may occur at the time of a decrease in the supply voltage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
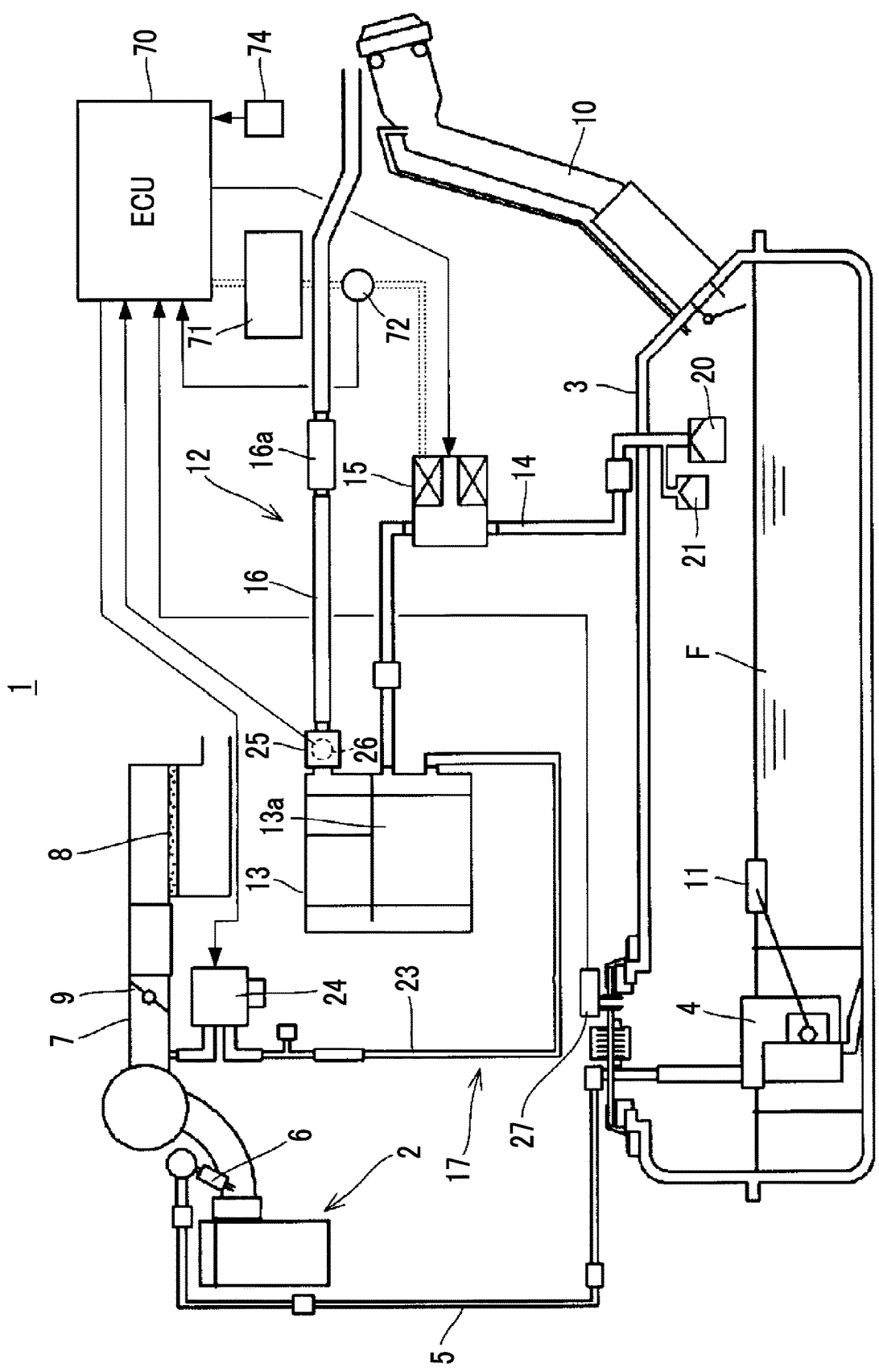
FIG. 1 is a configuration diagram schematically showing a part of a vehicle that includes an evaporated fuel treating device according to an embodiment of the disclosure.

As shown in FIG. 1, a vehicle 1 is provided with an internal combustion engine 2 provided as a drive source for traveling and configured as a gasoline engine, and a fuel tank 3 for storing gasoline that is fuel for the internal combustion engine 2. Fuel F stored in the fuel tank 3 is sucked up by a fuel pump 4 and supplied to an intake passage 7 of the internal combustion engine 2 through a feed pipe 5 and a fuel injection valve 6. An air filter 8 for air filtration and a throttle valve 9 for adjusting the amount of intake air are provided in the intake passage 7. An inlet pipe 10 for refueling is provided at the fuel tank 3. The remaining amount of the fuel F is detected by a float type remaining amount sensor 11.

The vehicle 1 is provided with an evaporated fuel treating device 12 for treating evaporated fuel generated in the fuel tank 3. The evaporated fuel treating device 12 is provided with a canister 13 having a built-in adsorbent 13a for adsorbing the evaporated fuel, a vapor passage 14 that connects the canister 13 and the fuel tank 3, a blocking valve 15 provided in the vapor passage 14 and capable of closing and opening the vapor passage 14, an atmosphere communication pipe 16 provided in the canister 13 to release the canister 13 to the atmosphere, and a purge device 17 for carrying out purge treatment of supplying purge gas separated from the canister 13 by outside air introduced into the canister 13 through the atmosphere communication pipe 16 to the intake passage 7 of the internal combustion engine 2.

An ORVR valve 20 and an OCV valve 21 are provided at a connection part between the vapor passage 14 and the fuel tank 3. The ORVR valve 20 and the OCV valve 21 are configured to cut off the communication between the vapor passage 14 and the fuel tank 3 in a case where the liquid level of the fuel F in the fuel tank 3 reaches the heights of the ORVR valve 20 and the OCV valve 21. The purge device 17 is provided with a purge passage 23 that connects the canister 13 and the intake passage 7 of the internal combustion engine 2 to lead the purge gas to the internal combustion engine 2, and a purge control valve 24 provided in the purge passage 23. The purge control valve 24 is configured as a valve device that is operated between a fully closed position where the purge passage 23 is closed to cut off the supply of the purge gas and a fully open position where the purge passage 23 is opened, for example, as an electromagnetic control type valve that is driven by an electromagnetic actuator or the like. When the purge control valve 24 is opened, the outside air filtered by an air filter 16a is led to the canister 13 through the atmosphere communication pipe 16. Accordingly, the purge gas separated from the canister 13 is supplied to the intake passage 7 of the internal combustion engine 2.

A key-off pump 25 is provided at a connection part between the atmosphere communication pipe 16 and the canister 13. The key-off pump 25 is provided in order to perform an inspection for detecting abnormality such as perforation of an object to be inspected such as the canister 13 or the fuel tank 3. The key-off pump 25 has a built-in pressure sensor 26 for measuring the pressure in the canister 13, in addition to a pump that is driven at the time of the inspection.

Figure 2:
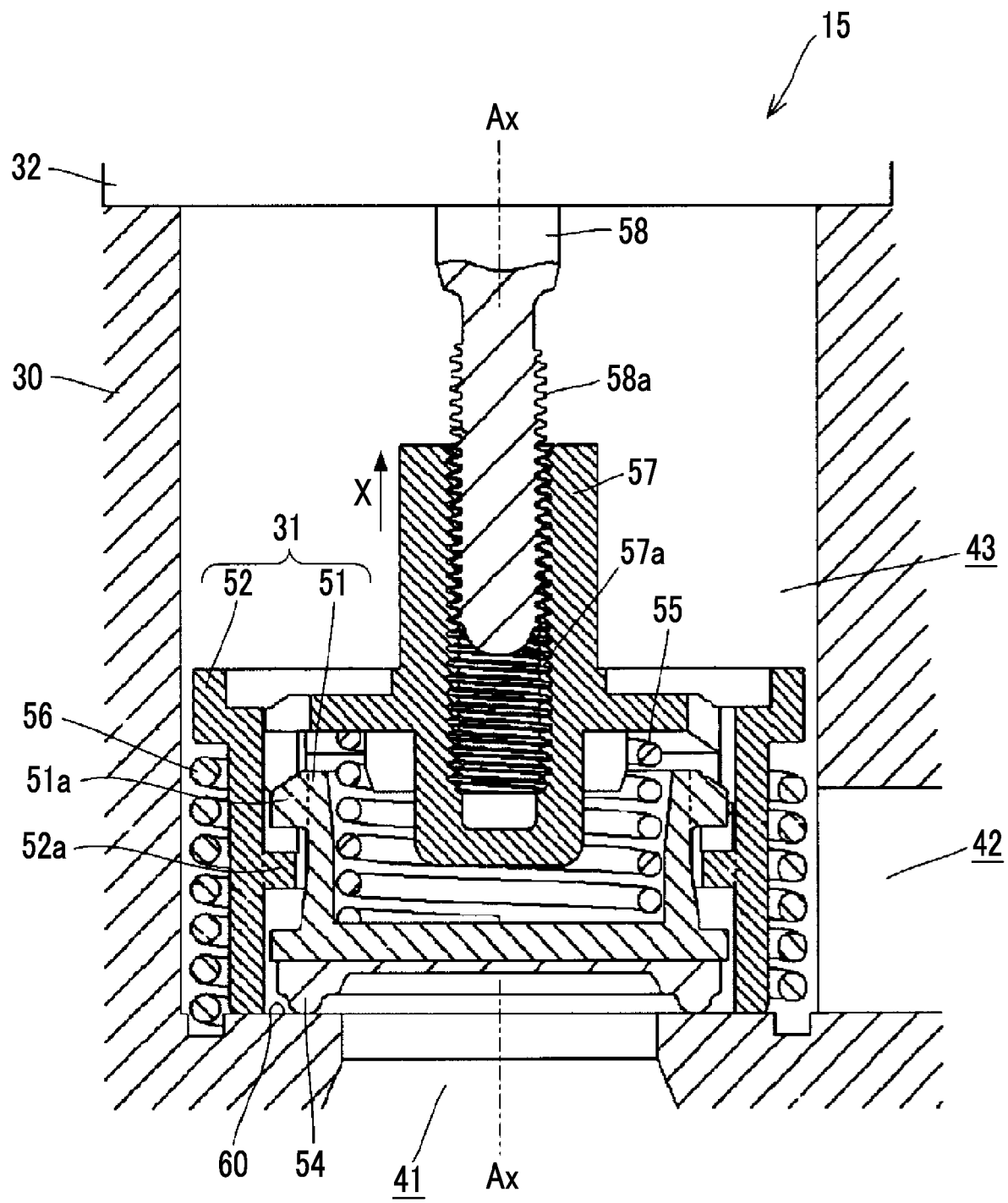
FIG. 2 is a sectional view showing a structure of a blocking valve.

The blocking valve 15 shown in detail in FIG. 2 is configured as an electrically operated flow rate control valve that closes the vapor passage 14 in the closed state, allows the opening of the vapor passage 14 in the open state, and can control the flow rate of the evaporated fuel by changing the degree of opening in the open state. As shown in FIG. 2, the blocking valve 15 is provided with a casing 30, a valve body 31 accommodated in the casing 30, and a stepping motor 32 that drives the valve body 31.

An inflow passage 41 into which the evaporated fuel flows, an outflow passage 42 through which the evaporated fuel flows out, and a valve chamber 43 that communicates with each of the inflow passage 41 and the outflow passage 42 and in which the valve body 31 is accommodated are formed in the casing 30. The valve body 31 includes an inner valve part 51 capable of closing the inflow passage 41, and a guide part 52 disposed so as to surround the inner valve part 51 and having an upper side closed and a lower side opened in FIG. 2. The inner valve part 51 and the guide part 52 are concentrically combined with each other with an axis Ax as the center in a state where the inner valve part 51 and the guide part 52 are movable relative to each other in the direction of the axis Ax. A seal member 54 made of, for example, synthetic rubber is provided at a lower end of the inner valve part 51, and the seal member 54 can close the inflow passage 41 by coming into close contact with a valve seat 60 of the casing 30 provided at the opening position of the inflow passage 41.

A coil spring 55 for biasing the inner valve part 51 toward the valve seat 60 side is provided in a compressed state between the inner valve part 51 and the guide part 52. The guide part 52 is provided in the casing 30 in a state of being movable in the direction of the axis Ax and in a state of being unable to rotate around the axis Ax. A coil spring 56 is provided in a compressed state between the guide part 52 and the casing 30. The guide part 52 is biased in a direction away from the valve seat 60 due to the elastic force of the coil spring 56. A female screw portion 57 is provided at an upper portion of the guide part 52. A female screw 57a formed in the female screw portion 57 is engaged with a male screw 58a formed on an output shaft 58 of the stepping motor 32. Accordingly, the guide part 52 of the valve body 31 moves in an opening direction indicated by an arrow X and a closing direction that is the opposite direction thereto, in accordance with the operation amount of the stepping motor 32.

The state shown in FIG. 2 is the state of the initial position where a lower end of the guide part 52 of the valve body 31 is located at the limit in the closing direction, where the lower end of the guide part 52 comes into contact with the valve seat 60, and the vapor passage 14 is closed. At this initial position, the seal member 54 of the inner valve part 51 is pressed against the valve seat 60 due to the elastic force of the coil spring 55, so that the blocking valve 15 is in the closed state. When the stepping motor 32 is driven such that the guide part 52 moves in the opening direction from the initial position, the lower end of the guide part 52 starts to be separated from the valve seat 60. Then, when the operation amount in the opening direction further increases, a protrusion portion 52a provided in the guide part 52 to protrude inward and a protrusion portion 51a provided in the inner valve part 51 to protrude outward come into contact with each other. The closed state, where the seal member 54 of the inner valve part 51 is pressed against the valve seat 60, is maintained before the protrusion portions 52a, 51a come into contact with each other. When the guide part 52 operates in the opening direction in a state where the protrusion portions 52a, 51a have come into contact with each other, the guide part 52 and the inner valve part 51 move together in the opening direction and the seal member 54 of the inner valve part 51 is separated from the valve seat 60. Accordingly, the inflow passage 41 is opened, and therefore, the inflow passage 41 and the outflow passage 42 communicate with each other through the valve chamber 43, so that the opening of the vapor passage 14 is allowed.

As described above, the blocking valve 15 is maintained in the closed state before the protrusion portion 52a of the guide part 52 and the protrusion portion 51a of the inner valve part 51 are brought into contact with each other by the operation of the blocking valve 15 in the opening direction from the initial position. For this reason, the operation range of the blocking valve 15 until the protrusion portions 52a, 51a are brought into contact with each other by the operation of the blocking valve 15 in the opening direction from the initial position is a valve closed range. The position at which the seal member 54 of the inner valve part 51 is separated from the valve seat 60 by the guide part 52 operating in the opening direction in a state where the protrusion portions 52a, 51a have come into contact with each other is the valve opening start position of the blocking valve 15.

The control of the evaporated fuel treating device 12 is performed by an engine control unit (ECU) 70 shown in FIG. 1 as an example. The ECU 70 is configured as a computer that controls the operating state of the internal combustion engine 2 shown in FIG. 1 and functions as an example of a controller in the disclosure. The ECU 70 is electrically connected to an auxiliary battery 71 provided as an example of a power supply of various devices such as the blocking valve 15 and operates with electric power that is supplied from the auxiliary battery 71. The voltage of the auxiliary battery 71 is monitored by the ECU 70, based on the output signal of a voltmeter 72. As the auxiliary battery 71, for example, a 12-volt lead battery is provided. Further, a temperature sensor 74 that measures an environmental temperature is provided.

The ECU 70 controls the operation of the blocking valve 15, for example, in order to carry out pressure reduction processing of reducing the internal pressure of the fuel tank 3, in consideration of the operating state of the internal combustion engine 2, the state of the internal pressure of the fuel tank 3, or the like. Variation occurs in the valve opening start position of the blocking valve 15 shown in detail in FIG. 2 due to a tolerance or a secular change of the guide part 52, the inner valve part 51, or the like of the blocking valve 15, and therefore, learning processing of detecting a valve opening start position specific to the blocking valve 15 while operating the blocking valve 15 in the opening direction and storing the detected valve opening start position as a learned value is executed by the ECU 70.

As described above, the blocking valve 15 is controlled in various situations. However, the blocking valve 15 uses the stepping motor 32 as a drive source, and therefore, if the blocking valve 15 is driven in a state where the voltage that is supplied from the auxiliary battery 71 has been lowered, there is a case where step-out occurs. In general, the lower the motor torque is, the more easily the step-out of the stepping motor occurs. Then, in the case of the same motor torque, the step-out more easily occurs as a driving period that is the interval between the pulses supplied to the stepping motor becomes shorter, that is, a driving speed becomes faster. The motor torque becomes smaller as the voltage that is supplied to the stepping motor decreases. Therefore, if, in a state where the motor torque is reduced due to a decrease in the voltage that is supplied to the stepping motor, the stepping motor is driven in the driving period before the decrease in voltage, there is a possibility that the step-out may occur.

Figure 3:
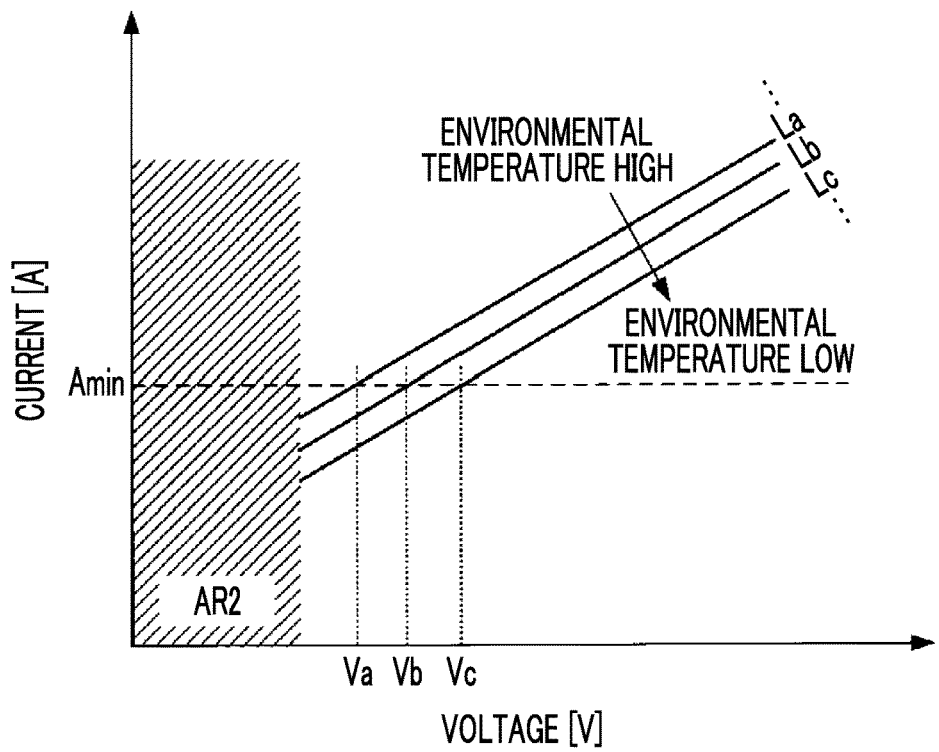
FIG. 3 is a graph showing a relationship between a voltage and a current of a stepping motor.

As shown in FIG. 3, the relationship between the voltage and the current that are supplied to the stepping motor 32 is a proportional relationship. However, the relationship depends on the environmental temperature, for example, the temperature around the stepping motor 32, and therefore, the relationship is represented by a plurality of straight lines La, Lb, Lc, . . . , the straight lines being different from each other for each environmental temperature. The straight lines La, Lb, Lc, . . . are arranged parallel to one another such that the straight line having a higher environmental temperature is disposed on the low current side. An ECU-inoperable region AR2 in which the ECU 70 cannot be operated is set as shown in the hatched region in the drawing. The intersection points of the respective straight lines La, Lb, Lc, . . . with a minimum drive current Amin become minimum drive voltages Va, Vb, Vc, . . . determined for each environmental temperature. As described above, the relationship between the voltage and the current that are supplied to the stepping motor 32 is in a proportional relationship, and therefore, the current decreases as the voltage decreases.

Figure 4:
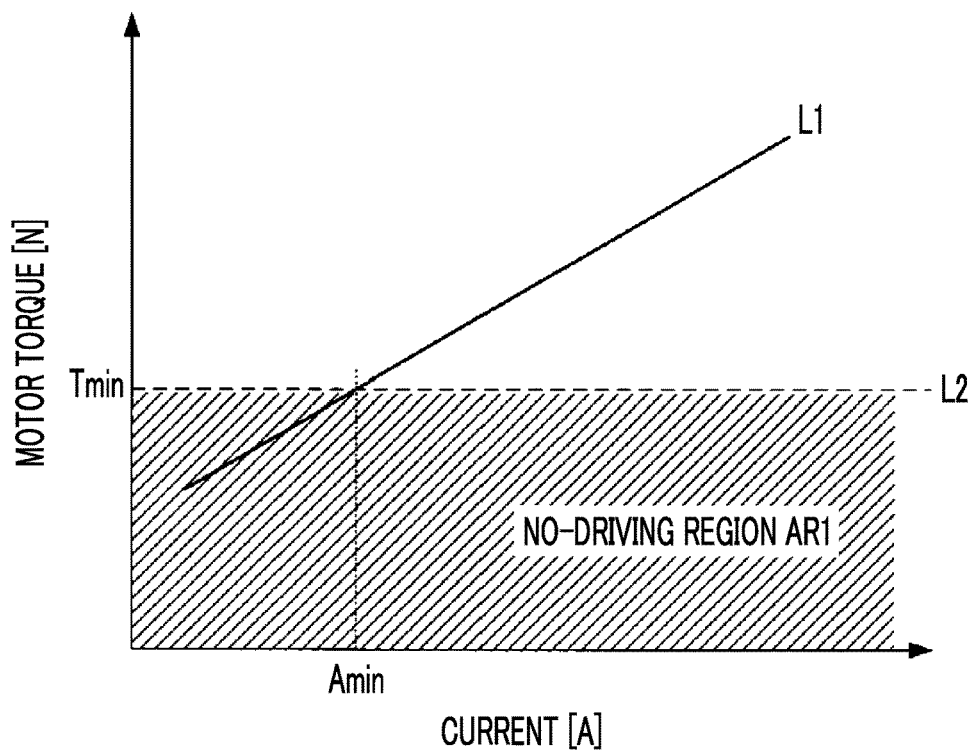
FIG. 4 is a graph showing a relationship between a motor torque and a current of the stepping motor.

As shown in FIG. 4, the current that is supplied to the stepping motor 32 of the blocking valve 15 and the motor torque that is output with the current are in a proportional relationship and the relationship is represented by a straight line L1. For this reason, if the current decreases, the motor torque decreases. Whether or not the blocking valve 15 is driven is determined by the motor torque, and therefore, a no-driving region AR1 in which the blocking valve 15 cannot be driven is set as shown in the hatched region in the drawing. When the motor torque is larger than the upper limit of the no-driving region AR1, it is possible to drive the blocking valve 15, and therefore, a minimum drive torque Tmin is set as a straight line L2 extending along the upper limit of the no-driving region AR1. The intersection point of the straight line L1 with the straight line L2 becomes the minimum drive current Amin that is the current that allows the stepping motor 32 to output the minimum drive torque Tmin.

Figure 5:
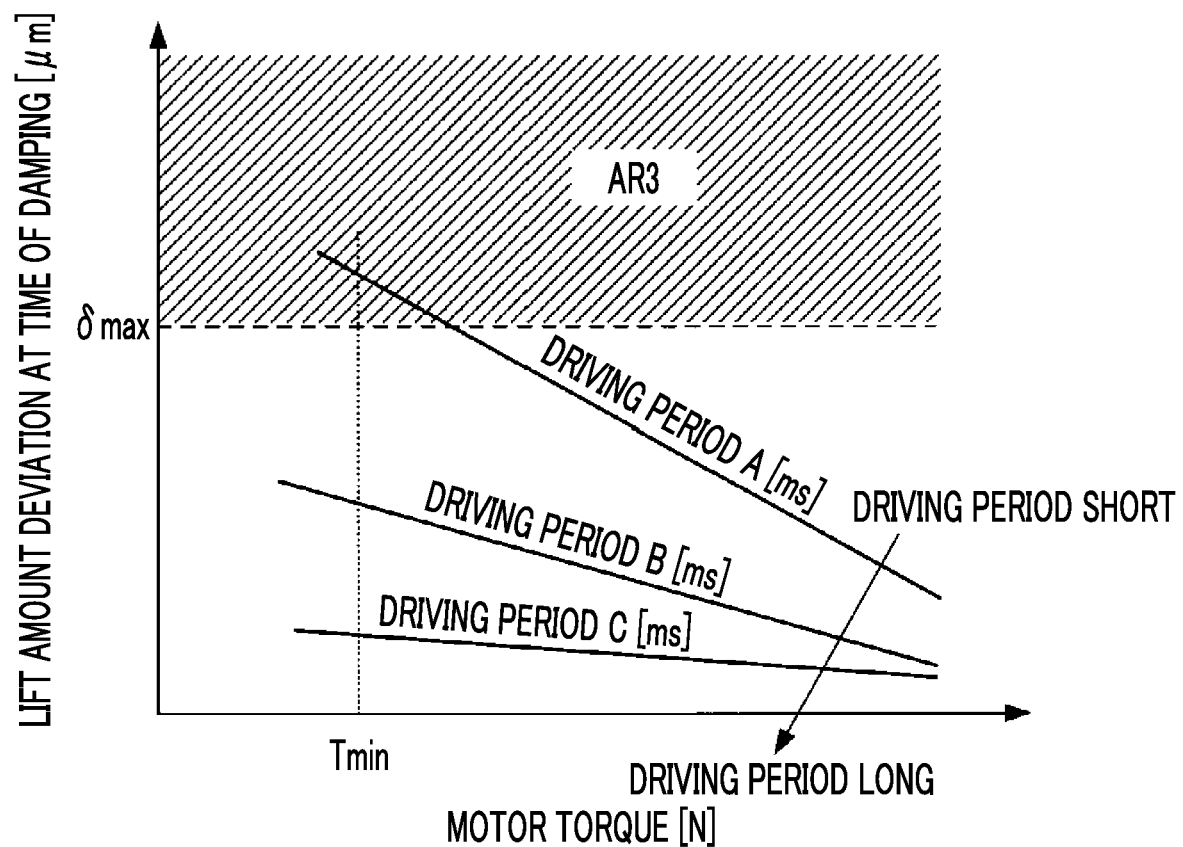
FIG. 5 is a graph showing a relationship between step-out of the stepping motor, a motor torque, and a driving period.

As shown in FIG. 5, the larger the motor torque of the stepping motor 32 becomes, the smaller a lift amount deviation at the time of damping becomes. The lift amount deviation at the time of damping is a physical quantity representing a deviation that is defined as a deviation from a target rotation amount corresponding to the pulse supplied to the stepping motor 32, as a deviation between the pulse and the lift amount of the blocking valve 15. If the lift amount deviation at the time of damping exceeds a step-out limit δmax that is the upper limit of an allowable range, it enters a step-out region AR3, and thus the stepping motor 32 steps out. The motor torque and the lift amount deviation at the time of damping are in a relationship in which the smaller the motor torque becomes, the larger the lift amount deviation at the time of damping becomes. The relationship depends on the driving period, and the longer the driving period is, the smaller the slope of the driving period becomes (refer to the driving periods A to C in FIG. 5). In a case where the driving period is short like the driving period A, a part enters the step-out region AR3 in a range where the motor torque is low, and thus the step-out occurs. Therefore, in a case where the motor torque becomes small due to a decrease in the voltage that is supplied to the blocking valve 15, it is found that the possibility of the step-out occurring at the time of a decrease in voltage can be reduced by making the driving period as long as possible.

Figure 6:
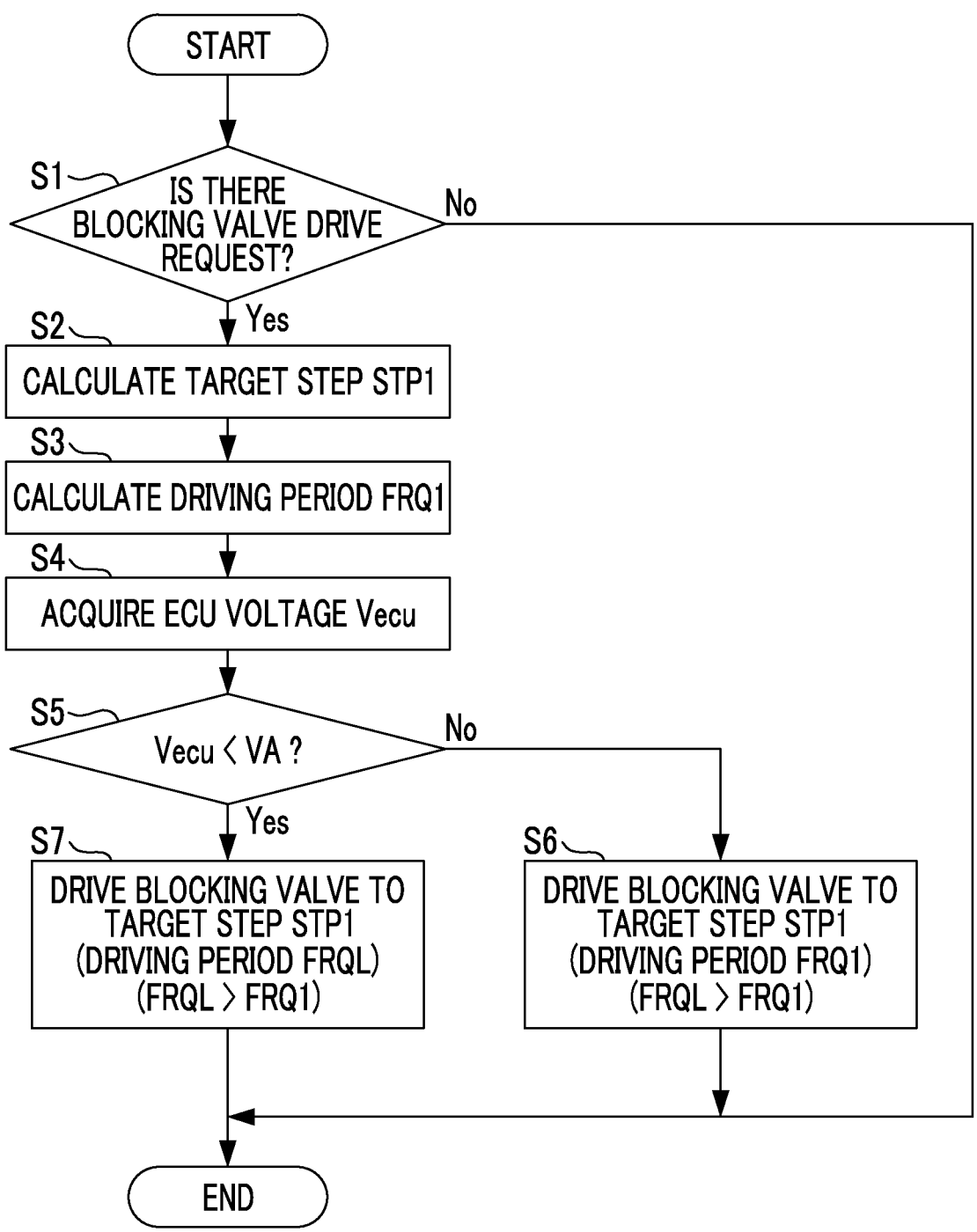
FIG. 6 is a flowchart showing an example of a control routine according to a first embodiment.

Based on the above idea, the ECU 70 operates the blocking valve 15 by controlling the electric power that is supplied from the auxiliary battery 71 such that the driving period that is the interval between the pulses that are supplied to the stepping motor 32 becomes long, in order to suppress the occurrence of the step-out in a case where the supply voltage to the blocking valve 15 decreases. The ECU 70 executes a control routine shown in FIG. 6 as an example. The program of the control routine of FIG. 6 is retained in the ECU 70 and repeatedly executed at a predetermined period. The ECU 70 executes the control routine of FIG. 6, thereby functioning as an example of a controller in the disclosure.

In step S1 in FIG. 6, the ECU 70 determines whether or not there is a drive request to drive the blocking valve 15 by the above-described pressure reduction control, learning processing, or the like. In a case where there is the drive request, the processing proceeds to step S2, and in a case where there is no drive request, the following processing is skipped and the current routine is ended.

In step S2, the ECU 70 calculates a target step STP1 that is the number of steps realizing the target operation amount of the blocking valve 15 by, for example, the pressure reduction control, the learning processing, or the like. In the subsequent step S3, the ECU 70 calculates a driving period FRQ1. The driving period FRQ1 may be a driving period set in advance or may be calculated so as to be a driving period according to a parameter capable of affecting the step-out, such as an environmental temperature or a voltage that the auxiliary battery 71 can supply to the blocking valve 15.

In step S4, the ECU 70 acquires a voltage (here, referred to as ECU voltage Vecu) that the auxiliary battery 71 can supply to the blocking valve 15, by referring to the output signal of the voltmeter 72.

Figure 7:
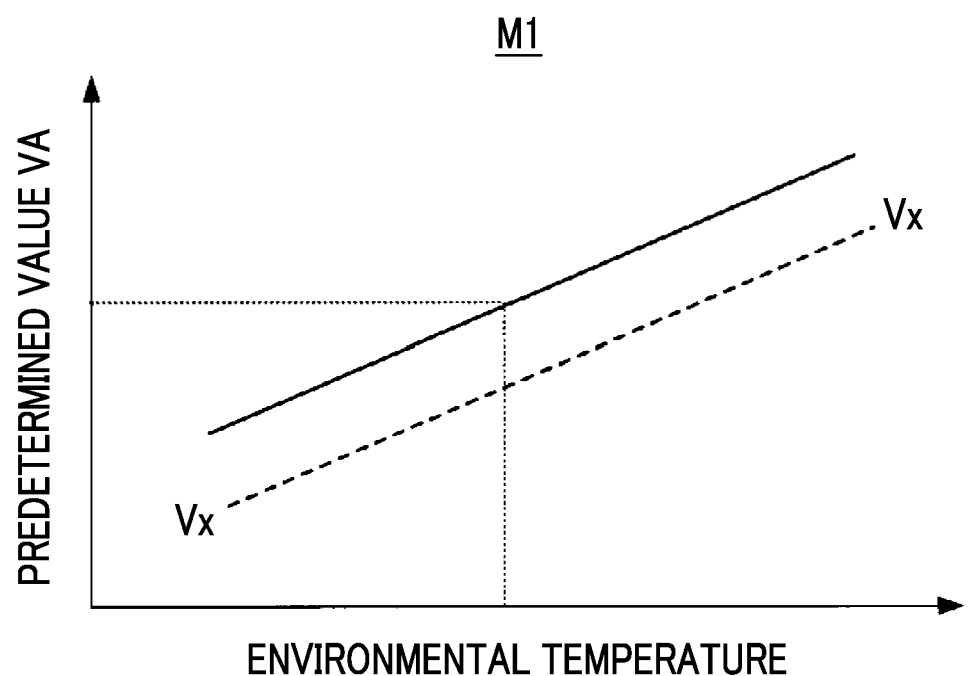
FIG. 7 is a graph schematically showing a data structure of a calculation map for calculating a predetermined value.

In step S5, the ECU 70 determines whether or not the ECU voltage Vecu acquired in step S3 is less than a predetermined value VA. The predetermined value VA is set in consideration of the possibility of occurrence of the step-out of the stepping motor 32. For example, the predetermined value VA is set to a value higher than the minimum drive voltages Va, Vb, Vc, . . . determined for each environmental temperature. As a specific method of setting the predetermined value VA, for example, as shown in FIG. 7, a calculation map M1 having a data structure that provides the predetermined value VA that is higher than a minimum drive voltage Vx and is higher as the environmental temperature such as an outside air temperature is higher is stored in the ECU 70 in advance, and the ECU 70 may calculate the predetermined value VA corresponding to the current environmental temperature by searching the calculation map M1. However, the predetermined value VA can also be set to a constant value higher than the minimum drive voltage Vx within the range of an assumed environmental temperature.

In a case where the ECU voltage Vecu is equal to or higher than the predetermined value VA, there is no concern about the step-out, and therefore, the processing proceeds to step S6, in which the ECU 70 drives the blocking valve 15 toward the target step STP1 in the driving period FRQ1 set in step S3. On the other hand, in a case where the ECU voltage Vecu is less than the predetermined value VA, there is a possibility of the step-out occurring, and therefore, the processing proceeds to step S7, in which the ECU 70 changes the driving period to the driving period FRQL longer than the driving period FRQ1 and drives the blocking valve 15 toward the target step STP1 in the driving period FRQL. In the processing described above, the ECU 70 is described so as to directly control the blocking valve 15. However, more precisely, the ECU 70 operates the blocking valve 15 by controlling the electric power that is supplied to the blocking valve 15 by operating a drive circuit (not shown) connected to the auxiliary battery 71.

The driving period FRQL that is changed in step S7 is set within a range in which the step-out can be avoided (refer to FIG. 5). Therefore, even if the blocking valve 15 is driven in the driving period FRQL, it is possible to eliminate the possibility of the step-out occurring. The driving period FRQL corresponds to an example of a first driving period in the disclosure, and the driving period FRQ1 corresponds to an example of a second driving period in the disclosure.

According to the first embodiment, when the ECU voltage Vecu is less than the predetermined value VA, the electric power is controlled such that the driving period becomes longer than when the ECU voltage Vecu is equal to or higher than the predetermined value VA. For this reason, at the time of a decrease in the ECU voltage Vecu, the driving period becomes longer than before the decrease in the ECU voltage Vecu, and therefore, it becomes difficult for the stepping motor 32 to step out. Accordingly, it is possible to eliminate a possibility that the step-out of the stepping motor 32 that is the drive source of the blocking valve 15 may occur at the time of a decrease in the ECU voltage Vecu. In the first embodiment, the possibility of the step-out occurring can be eliminated by simple control of selectively using two long and short driving periods. Further, in the first embodiment, the driving period is changed according to the environmental temperature by setting the predetermined value VA to be higher as the environmental temperature becomes higher, and therefore, the relationship between the environmental temperature and the driving period can be optimized.

Second Embodiment

A second embodiment of the disclosure will be described with reference to FIG. 8. The second embodiment is common to the first embodiment except for the control content, and therefore, the description of the common parts is omitted. With respect to the physical configurations of the second embodiment, FIGS. 1 and 2 and the description related thereto are referred to as appropriate.

Figure 8:
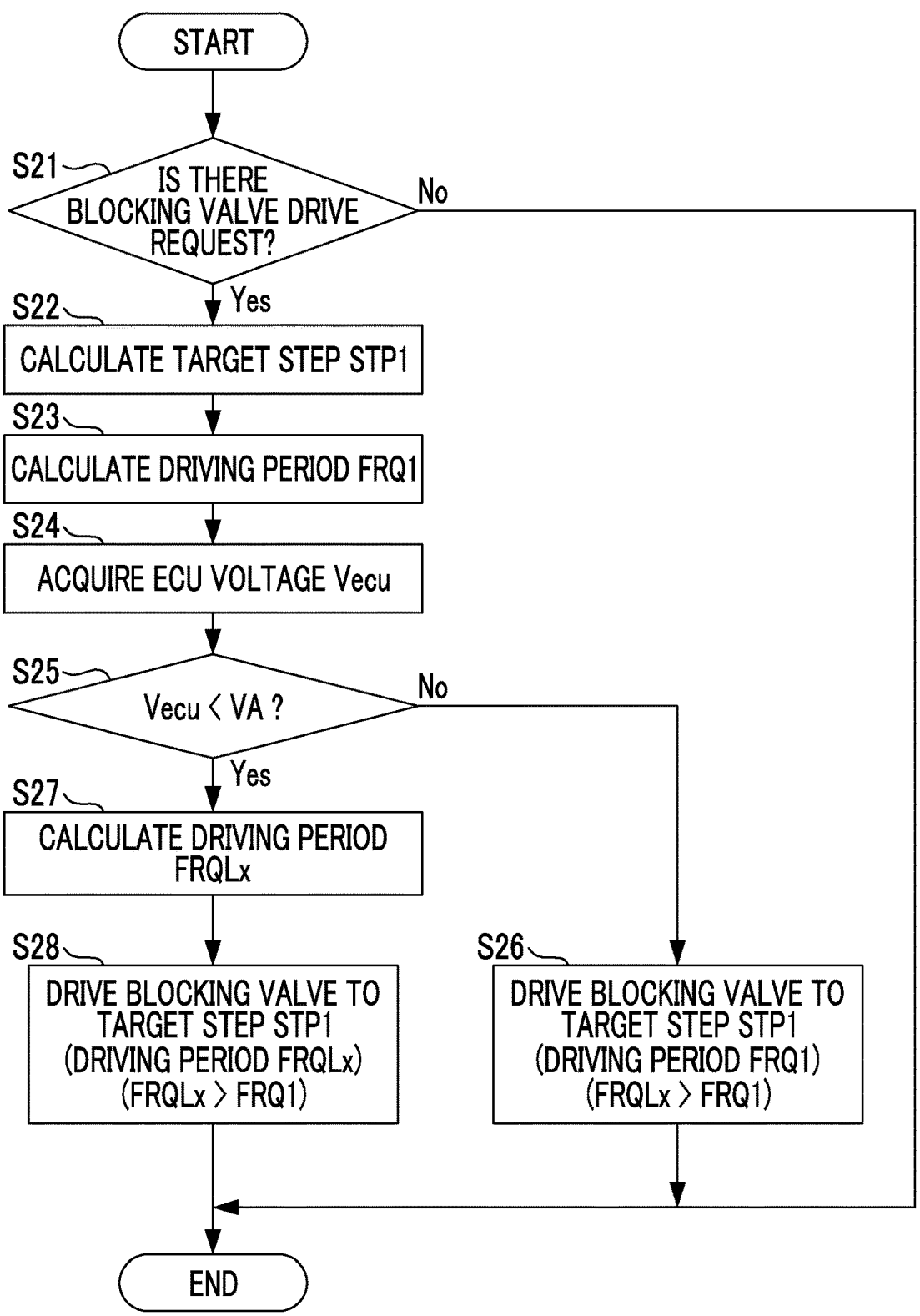
FIG. 8 is a flowchart showing an example of a control routine according to a second embodiment.

The program of the control routine of FIG. 8 is retained in the ECU 70 and is read out in a timely manner and repeatedly executed at predetermined intervals. Steps S21 to S26 in FIG. 8 are the same processing as steps S1 to S6 in FIG. 6 of the first embodiment, respectively, and therefore, the description thereof will be omitted here.

Figure 9:
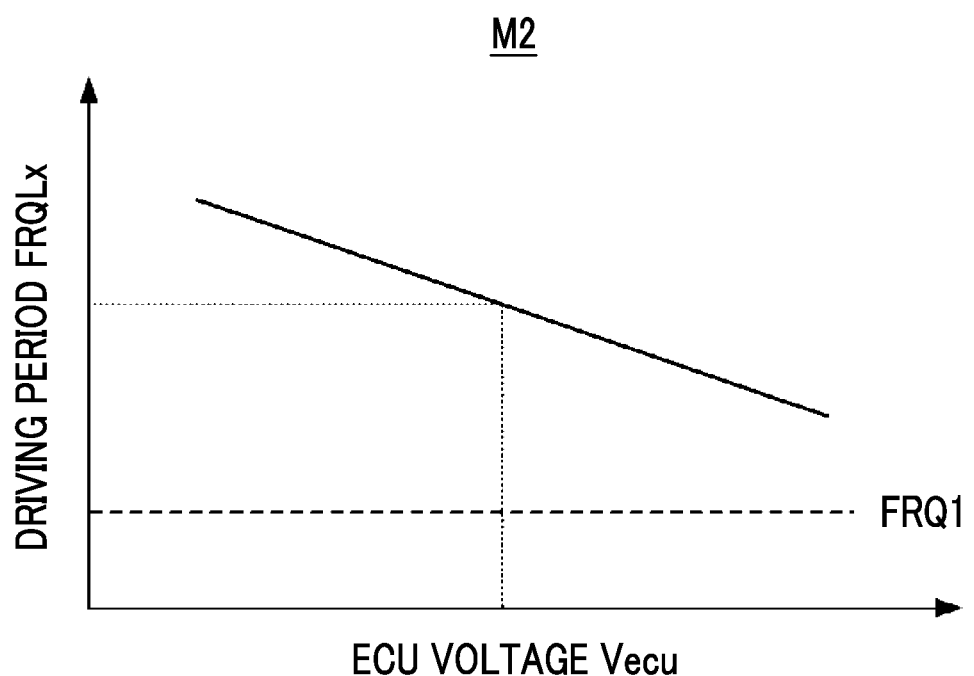
FIG. 9 is a graph schematically showing a data structure of a calculation map for calculating the driving period.

In step S25, in a case where the ECU 70 determines that the ECU voltage Vecu is less than the predetermined value VA, the processing proceeds to step S27. In step S27, the ECU 70 calculates a driving period FRQLx that is used at the time of a decrease in voltage. The driving period FRQLx is set according to the ECU voltage Vecu. For example, as shown in FIG. 9, a calculation map M2 having a data structure that provides the driving period FRQLx that is longer than the driving period FRQ1 and is longer as the ECU voltage Vecu is lower is stored in the ECU 70 in advance, and the ECU 70 may calculate the driving period FRQLx corresponding to the current ECU voltage Vecu by searching the calculation map M2. The driving period FRQLx that is defined in the calculation map M2 is set within a range in which the step-out can be avoided. Therefore, even if the blocking valve 15 is driven in the driving period FRQLx, the step-out does not occur.

In step S28, the ECU 70 drives the blocking valve 15 toward the target step STP1 in the driving period FRQLx calculated in step S27.

According to the second embodiment, similar to the first embodiment, when the ECU voltage Vecu is less than the predetermined value VA, the electric power is controlled such that the driving period becomes longer than when the ECU voltage Vecu is equal to or higher than the predetermined value VA. For this reason, at the time of a decrease in the ECU voltage Vecu, the driving period becomes longer than before the decrease in the ECU voltage Vecu, and therefore, it becomes difficult for the stepping motor 32 to step out. Accordingly, it is possible to eliminate a possibility that the step-out of the stepping motor 32 that is the drive source of the blocking valve 15 may occur at the time of a decrease in the ECU voltage Vecu. In the second embodiment, the driving period is changed according to the environmental temperature by setting the predetermined value VA to be higher as the environmental temperature becomes higher, and therefore, the relationship between the environmental temperature and the driving period can be optimized. Further, in the second embodiment, the driving period according to the voltage is selected, and therefore, the relationship between the voltage and the driving period can be optimized.

The disclosure is not limited to each of the embodiments described above and can be implemented in various embodiments within the scope of the gist of the disclosure. As long as the blocking valve has, as a drive source thereof, a stepping motor that is a motor that is operated with the supply of a periodic pulse current, the embodiment of the blocking valve is not limited to the illustrated example. For example, a ball valve that includes a spherical valve body having a through flow passage formed therein and a valve seat rotatably holding the valve body and communicating with the vapor passage, and in which the degree of opening can be adjusted by rotating the valve body with a stepping motor as a drive source, can be adopted as an example of the blocking valve in the disclosure. As long as it is a valve having a stepping motor as a drive source, a valve that does not have a dead zone in an opening direction in a design can also be adopted as an example of the blocking valve.

The vehicle 1 in the embodiments described above is a vehicle in which the internal combustion engine 2 is provided as a drive source for traveling. However, the vehicle 1 can also be changed to a hybrid vehicle provided with a motor as a drive source for traveling, in addition to the internal combustion engine 2. The internal combustion engine 2 is a gasoline engine. However, the internal combustion engine that can be the subject of the disclosure may be a diesel engine or a bi-fuel engine that can use a mixed fuel of gasoline and alcohol.

In each of the embodiments described above, the driving period is changed by determining the voltage by a single predetermined value VA. However, the single predetermined value VA is merely an example of the predetermined value in the disclosure. For example, the disclosure can also be implemented in an embodiment in which a plurality of predetermined values having different sizes are set and the driving period is changed in multiple stages that are three or more stages. In this case, the plurality of predetermined values correspond to an example of the predetermined value in the disclosure. The disclosure can also be implemented in an embodiment in which separate predetermined values are set for a case where the voltage decreases and a case where the voltage rises and a hysteresis for changing the driving period at the predetermined values is provided. In this case, the separate predetermined values correspond to an example of the predetermined value in the disclosure.

In each of the embodiments described above, the driving period at the time of a decrease in voltage is set within a range in which the step-out of the stepping motor can be avoided, and therefore, the possibility of the step-out occurring can be eliminated. However, by making the driving period longer than before a decrease in voltage, the possibility of the step-out occurring is reduced. Therefore, for example, it is also possible to implement the disclosure in an embodiment in which the driving period is changed twice as compared with before the decrease in voltage. In this case, by changing the driving period, the possibility of the step-out occurring at the time of a decrease in voltage is reduced.

What is claimed is:

1. An evaporated fuel treating device comprising:
a canister configured to adsorb evaporated fuel generated in a fuel tank through a vapor passage;
a blocking valve configured to close and open the vapor passage, the blocking valve having a stepping motor as a drive source; and
a controller configured to operate the blocking valve by controlling electric power that is supplied from a predetermined power supply to the blocking valve,
wherein the controller is configured, in a case where there is a request to drive the blocking valve, to operate the blocking valve by controlling the electric power such that when a voltage that is supplied from the power supply to the blocking valve is less than a predetermined value, a driving period which is an interval between pulses that are supplied to the stepping motor becomes long compared to when the voltage is equal to or higher than the predetermined value.

2. The evaporated fuel treating device according to claim 1, wherein the controller is configured, when an environmental temperature measured by a temperature sensor is high, to set the predetermined value to be higher than when the environmental temperature is low.

3. The evaporated fuel treating device according to claim 2, wherein the controller is configured to set the predetermined value to a value higher than a minimum drive voltage determined in advance for each environmental temperature.

4. The evaporated fuel treating device according to claim 1, wherein the controller is configured to operate the blocking valve in a first driving period when the voltage is less than the predetermined value, and is configured to operate the blocking valve in a second driving period shorter than the first driving period, when the voltage is equal to or higher than the predetermined value.

5. The evaporated fuel treating device according to claim 1, wherein the controller is configured to change the driving period according to a magnitude of the voltage when the voltage is less than the predetermined value.

6. The evaporated fuel treating device according to claim 5, wherein the controller is configured to set the driving period to be longer as the voltage is lower, when the voltage is less than the predetermined value.

7. The evaporated fuel treating device according to claim 1, wherein the controller is configured to set the driving period within a range in which step-out of the stepping motor is avoided, when the voltage is less than the predetermined value.

8. The evaporated fuel treating device according to claim 4, wherein the controller is configured to set the predetermined value such that the predetermined value in a case where the voltage decreases and the predetermined value in a case where the voltage rises are different from each other.

* * * * *